(12) United States Patent
Wang et al.

(10) Patent No.: US 11,375,577 B2
(45) Date of Patent: *Jun. 28, 2022

(54) METHOD AND APPARATUS FOR RETRANSMISSION

(71) Applicant: NXP USA, INC., Austin, TX (US)

(72) Inventors: Lei Wang, San Diego, CA (US); Liwen Chu, San Ramon, CA (US); Jinjin Jiang, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/797,242

(22) Filed: Feb. 21, 2020

(65) Prior Publication Data

US 2020/0196385 A1 Jun. 18, 2020

Related U.S. Application Data

(63) Continuation of application No. 16/421,136, filed on May 23, 2019, now Pat. No. 10,595,361, which is a continuation of application No. 15/589,774, filed on May 8, 2017, now Pat. No. 10,306,704.

(60) Provisional application No. 62/332,686, filed on May 6, 2016.

(51) Int. Cl.
*H04W 84/02* (2009.01)
*H04L 1/16* (2006.01)
*H04L 1/18* (2006.01)
*H04W 28/02* (2009.01)
*H04W 72/12* (2009.01)

(52) U.S. Cl.
CPC .......... *H04W 84/02* (2013.01); *H04L 1/1607* (2013.01); *H04L 1/1887* (2013.01); *H04W 28/0273* (2013.01); *H04W 72/1263* (2013.01)

(58) Field of Classification Search
CPC ............. H04W 84/02; H04W 28/0273; H04W 72/1263; H04L 1/1607; H04L 1/1887
See application file for complete search history.

(56) References Cited

U.S. PATENT DOCUMENTS

| | | | | |
|---|---|---|---|---|
| 10,595,361 B2* | 3/2020 | Wang | ............... | H04L 47/781 |
| 2002/0129312 A1* | 9/2002 | Sipola | ............... | H04L 1/1809 |
| | | | | 714/748 |
| 2008/0025337 A1* | 1/2008 | Smith | ............... | H04W 72/005 |
| | | | | 370/439 |

* cited by examiner

*Primary Examiner* — Brenda H Pham

(57) ABSTRACT

Aspects of the disclosure provide an apparatus for wireless communication. The apparatus includes a transceiver and a processing circuit. The transceiver is configured to transmit and receive wireless signals. The processing circuit is configured to detect an error of a previous scheduled transmission of data units from the apparatus to another apparatus. The other apparatus provides scheduled resources for transmission between the two apparatuses. Further, the processing circuit is configured to determine resources that are scheduled by the other apparatus for the apparatus to perform retransmission, and provide one or more of the data units in the previous scheduled transmission to the transceiver for retransmission using the scheduled resources.

20 Claims, 8 Drawing Sheets

METHOD AND APPARATUS FOR RETRANSMISSION

This application is a continuation application of U.S. patent application entitled "METHOD AND APPARATUS FOR RETRANSMISSION", having a Ser. No. 16/421,136, having a filing date of May 23, 2019; which is a continuation of U.S. patent application entitled "METHOD AND APPARATUS FOR RETRANSMISSION", having a Ser. No. 15/589,774, having a filing date of May 8, 2017; which claim the benefit of the U.S. provisional application entitled "HE RETRANSMISSION RULES", having a Ser. No. 62/332,686, and having a filed date of May 6, 2016, having common inventors, and having a common assignee, all of which is incorporated by reference in its entirety.

INCORPORATION BY REFERENCE

This present disclosure claims the benefit of U.S. Provisional Application No. 62/332,686, "HE RETRANSMISSION RULES" filed on May 6, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus for wireless communication. The apparatus includes a transceiver and a processing circuit. The transceiver is configured to transmit and receive wireless signals. The processing circuit is configured to detect an error of a previous scheduled transmission of data units from the apparatus to another apparatus. The other apparatus provides scheduled resources for transmission between the two apparatuses. Further, the processing circuit is configured to determine resources that are scheduled by the other apparatus for the apparatus to perform retransmission, and provide one or more of the data units in the previous scheduled transmission to the transceiver for retransmission using the scheduled resources.

In an embodiment, the processing circuit is configured to determine the resources that are scheduled by the other apparatus for retransmission without using a backoff procedure.

In an example, the processing circuit is configured to detect the error of the previous scheduled transmission at a sub channel level, and provide the data units of the previous scheduled transmission to the transceiver for retransmission using the scheduled resources.

In another example, the processing circuit is configured to detect the error of a specific data unit in the data units in the previous scheduled transmission and provide the data unit to the transceiver for retransmission using the scheduled resources.

In an embodiment, the processing circuit is configured to provide a request frame to the transceiver to send a resource request for retransmission to the other apparatus, receive a signal indicative of the resources that are scheduled by the other apparatus for retransmission and provide the one or more data units in the previous scheduled transmission to the transceiver for retransmission using the scheduled resources.

In another embodiment, the processing circuit is configured to use contention to gain channel access for retransmission when the one or more of the data units for retransmission are time sensitive.

Aspects of the disclosure provide a method for wireless communication. The method includes detecting, at an apparatus, an error of a previous scheduled transmission of data units from the apparatus to another apparatus that provides scheduled resources for transmission between the two apparatuses, determining resources that are scheduled by the other apparatus for the apparatus to perform retransmission, and re-transmitting one or more of the data units in the previous scheduled transmission using the scheduled resources.

Aspects of the disclosure provide an apparatus for wireless communication. The apparatus includes a transceiver and a processing circuit. The transceiver is configured to transmit and receive wireless signals. The processing circuit is configured to schedule resources of a communication channel to one or more other apparatuses by sub channels, provide data units for the one or more other apparatus to the transceiver to transmit in a first transmission using the scheduled resources, detect an error in a channel level and provide, to the transceiver, one or more data units selected from the data units in the first transmission based on the channel level for retransmission using the scheduled resources.

Aspects of the disclosure provide a method for wireless communication. The method includes scheduling, by an apparatus, resources of a communication channel to one or more other apparatuses by sub channels, transmitting data units to the one or more other apparatus in a first transmission using the scheduled resources, detecting an error in a channel level, and retransmitting one or more data units selected from the data units in the first transmission based on the channel level using the scheduled resources.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
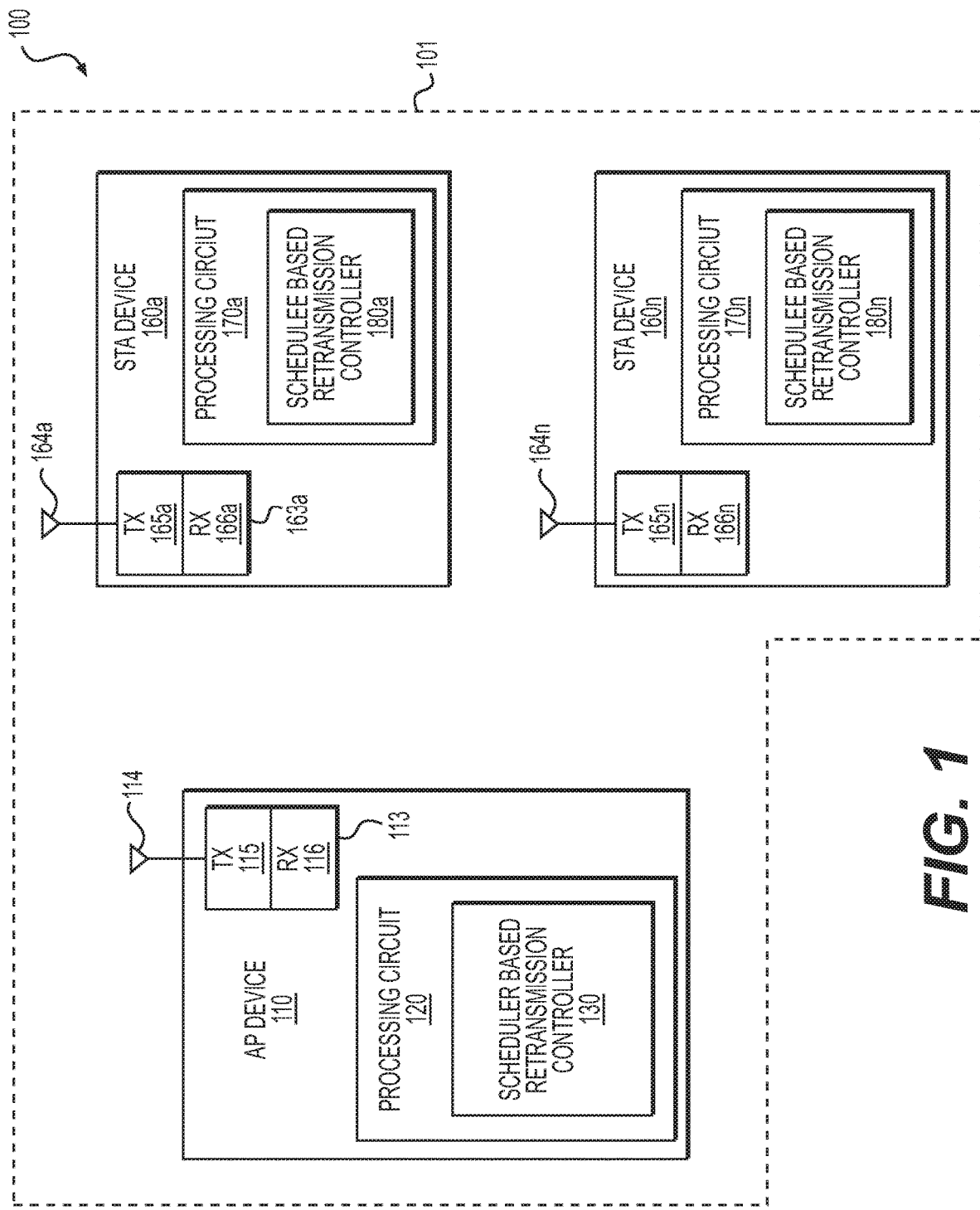
FIG. 1 shows a block diagram of a network 100 according to an embodiment of the disclosure.

FIG. 1 shows a block diagram of a network 100 according to an embodiment of the disclosure. The network 100 includes a first electronic device 110 and one or more second electronic devices 160a-160n that communicate using scheduling based transmission. In the FIG. 1 example, the first electronic device 110 is the scheduler configured to schedule resources (e.g., timing, frequency, resource element, resource unit) of a communication channel for transmission between the first electronic device 110 and the second electronic devices 160a-160n, and the second electronic devices 160a-160n are schedulees configured to perform transmission according to the scheduled resources by the first electronic device 110. Further, the first electronic device 110 and the second electronic devices 160a-160n are configured to perform scheduling-based retransmission in response to errors in the previous transmissions.

The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like. In an example, the first electronic device 110 and the second electronic devices 160a-160n are in a basic service set (BSS) 101 that is implemented using WLAN technology to interconnect the first device 110 and the second devices 160a-160n. The network 100 includes other suitable interconnections (not shown), such as a LAN, a fiber optical network, and the like to provide connections for the BSS 101 to be connected to for example Internet.

In an embodiment, the BSS 101 is an infrastructure type basic service set. The first electronic device 110 is an access point (AP) device, and the second electronic devices 160-a-160n are station (STA) devices. The second electronic devices 160a-160n communicate through the first device 110, and the first device 110 includes network hardware and software configured to serve as a bridge to allow wireless compliant devices, such as the second electronic devices 160a-160n to connect to other part of the network 100.

Each of the second electronic devices 160a-160n in the network 100 can be any suitable device, such as a desktop computer, a laptop computer, a tablet computer, a smart phone, a personal digital assistant (PDA), a smart watch, a smart camera, a smart TV, a smart voice recorder, a wearable device, and the like. According to an aspect of the disclosure, the second electronic devices 160a-160n in the network 100 are implemented using the same version or different versions of a wireless standard, such as various IEEE 802.11 standards.

In the FIG. 1 example, the second electronic devices 160a-160n share resources of a communication channel for a transmission, and the first electronic device 110 is configured to schedule the resources of the transmission (e.g., timing, frequency, resource element, resource unit) to data unit (e.g., frame) exchanges between the first electronic device 110 and the second electronic devices 160a-160n. The second electronic devices 160a-160n are configured to perform transmission according to the scheduled resources. For example, at a time, the first electronic device 110 plans to transmit data units respectively to a group of second electronic devices among the second electronic devices 160a-160n. The group of second electronic devices involved in a transmission is referred to as targeted second electronic devices. The first electronic device 110 allocates resources of a transmission to the targeted second electronic devices, and performs a transmission to transmit data units respectively to the targeted second electronic devices in the same transmission according to the resource allocation of the transmission.

In another example, the first electronic device 110 schedules to receive data units respectively targeted second electronic devices among the second electronic devices 160a-160n. The first electronic device 110 allocates resources of a transmission to the targeted second electronic devices. The targeted second electronic devices perform transmissions in a same time duration to respectively transmit data units to the first electronic device 110 according to resource allocation, and the first electronic device 110 receives the data units from the targeted second electronic devices in the same scheduled time duration for example.

According to an aspect of the disclosure, devices in the BSS 101, such as the first electronic device 110, the second electronic devices 160a-160n and the like are configured to transmit two or more data units using an aggregation technique. In an embodiment, the first electronic device 110 aggregates two or more media access control (MAC) protocol data units (MPDUs) to a same destination device (e.g., a second electronic device), and forms an aggregated MPDU (A-MPDU). For example, the first electronic device 110 collects Ethernet frames (e.g., data units) to the same destination device, and wraps each frame individually with a MAC header. Then the first electronic device 110 groups the wrapped frames into a larger frame. In the example, at the reception side, the destination device can selectively acknowledge individual Ethernet frames.

In an embodiment, the first electronic device 110 is configured to schedule the resources of the communication channel to targeted second electronic devices among the second electronic devices 160a-160n by sub channels, and each sub channel is configured to transmit one or more data units. In an example, the communication channel is allocated in the frequency domain as frequency bands. A frequency band is then allocated as a sub channel in an example.

In another example, the communication channel is allocated in the time domain as sub streams of a full stream. A sub stream is then allocated as a sub channel in an example. In another example, the communication channel is configured using orthogonal frequency-division multiplexing (OFDM) technology. In an example, a group of OFDM symbols is allocated as a sub channel.

According to an aspect of the disclosure, transmission failures happen at various channel level, such as a full channel level, a sub channel level, a data unit level, and the like. The first electronic device 110 and the second electronic devices 160a-160n are configured to detect transmission errors at the different channel levels, and perform scheduling-based retransmission in response to transmission errors based on the detected channel levels of the transmission errors.

Specifically, in the FIG. 1 example, the first electronic device 110 includes a first transceiver circuit 113 and a first processing circuit 120 coupled together as shown in FIG. 1. In the example, the first transceiver circuit 113 includes a first receiving circuit 116 and a first transmitting circuit 115 that are both coupled to a first antenna 114, and the first processing circuit 120 includes a first retransmission controller 130 that is scheduler based retransmission controller.

The first transceiver circuit 113 is configured to receive and transmit wireless signals. For example, the first receiving circuit 116 is configured to generate electrical signals in response to captured electromagnetic waves by the first antenna 114, process the electrical signals to extract digital streams from the electrical signals. In an example, the first transmitting circuit 115 is configured to receive digital streams, such as management frames, data frames, and the like from for example the first processing circuit 120, generate radio frequency (RF) signals to carry the digital streams, and emit electromagnetic waves in the air via the first antenna 114 to transmit wireless signals that carry the digital streams.

The second electronic device 160a includes a second transceiver circuit 163a and a second processing circuit 170a coupled together. The second transceiver circuit 163a includes a second transmitting circuit 165a and a second receiving circuit 166a that are both coupled to a second antenna 164a. The second processing circuit 170a includes a second retransmission controller 180a that is schedulee based retransmission controller. Other second electronic devices are configured similarly as the second electronic device 160a.

The second transceiver circuit 163a is configured to receive and transmit wireless signals. For example, the second receiving circuit 166a is configured to generate electrical signals in response to captured electromagnetic waves by the second antenna 164a, process the electrical signals to extract digital streams from the electrical signals. In an example, the second transmitting circuit 165a is configured to receive digital streams, such as management frames, data frames, and the like from for example the processing circuit 170a, generate radio frequency (RF) signals to carry the digital streams, and emit electromagnetic waves in the air via the second antenna 164a to transmit wireless signals that carry the digital streams.

According to an aspect of the disclosure, the first retransmission controller 130 and the second retransmission controllers 180a-n are configured to detect transmission errors at the different channel levels, and control scheduling-based retransmission in response to transmission errors based on the detected channel levels of the transmission errors.

In an embodiment, the first electronic device 110 and the second electronic devices 160a-160n are implemented according to an open systems interconnection model (OSI model) with a plurality of layers, such as a physical (PHY) layer, a media access control (MAC) layer, a network layer, and the like from bottom up. In an example, the PHY layer includes transceiver circuits and baseband processing circuits in the processing circuits. In an embodiment, the first retransmission controller 130 and the second retransmission controllers 180a-180n are implemented in the MAC layer using circuits. In another embodiment, the first retransmission controller 130 and the second retransmission controllers 180a-180n are implemented as processors executing software instructions.

It is noted that while single antenna per device is used in the FIG. 1 example, the network 100 can be suitably modified to use multiple input, multiple output (MIMO) antenna technology.

According to an aspect of the disclosure, the first retransmission controller 130 detects an error in the full channel level when a specific timer expires. In an example, the specific timer tracks a time duration from a transmission to a proper reply, and when the time is longer than a threshold, the specific timer expires or has a timeout. In an example, the specific timer measures a time duration from a transmission of data units to a reception of a proper acknowledgement (ACK) frame, and is referred to as an ACK timer. In another example, the specific timer measures a time duration from a transmission of a request to send (RTS) frame to a reception of a clear to send (CTS) frame, and is referred to as a CTS timer.

In another embodiment, the first retransmission controller 130 detects an error in the full channel level when the first electronic device 110 receives unscheduled transmission. In an example, the first electronic device 110 transmits data units, and expects reception of an ACK frame. When the first electronic device 110 receives frame other than the ACK frame, the first retransmission controller 130 detects an error in the full channel level. In another example, the first electronic device 110 transmits a RTS frame, and expects reception of a CTS frame. When the first electronic device 110 receives frame other than the CTS frame, the first retransmission controller 130 detects an error in the full channel level. In another example, the first electronic device 110 transmits a trigger signal that is indicative of resources allocation to targeted second electronic devices, and expects reception of uplink transmission from the targeted second electronic devices. When the first electronic device 110 receives uplink transmission from a second electronic device that is not in the targeted second electronic devices, the first retransmission controller 130 detects an error in the full channel level.

In another embodiment, the first retransmission controller 130 detects an error in a sub channel level when the first electronic device 110 fails to receive uplink transmission from one of the targeted second electronic devices. In an example, the first electronic device 110 transmits a trigger signal that is indicative of resources allocation to targeted second electronic devices, and expects reception of uplink transmission from the targeted second electronic devices. When the first electronic device 110 fails to receive uplink transmission from one of the targeted second electronic devices, the first retransmission controller 130 detects an error in the sub channel level.

In another embodiment, the first retransmission controller 130 detects an error in a data unit (e.g., MPDU) level when the first retransmission controller 130 detects one or more unacknowledged data units in a block acknowledgement (BA). In an example, the first electronic device 110 transmits data units to a targeted second electronic device, and receives a BA. When the first retransmission controller 130 detects that the BA does not include acknowledgement for one or more of the transmitted data units, the first retransmission controller 130 detects an error in the data unit level.

Additionally, the first retransmission controller 130 is configured to control retransmission based on the transmission error levels. In an example of an error in the full channel level, the first retransmission controller 130 is configured to use a backoff procedure with exponentially increased (e.g., doubled) contention window to gain a next channel access. Generally, the contention window is set according to expected communication traffic. In an example, the error in the full channel level is indicative of heavier communication traffic, thus the contention window is set wider. The first retransmission controller 130 randomly selects a value within the contention window, and sets a backoff counter for the backoff procedure. The backoff procedure is used to defer an access to transmission medium (e.g., a communication channel) when the transmission medium is idle.

When the first electronic device 110 gains the next channel access, in an example, the first retransmission controller 130 controls the processing circuit 120 to provide the same A-MPDU to the first transmitting circuit 115 for transmission. In another example, the first retransmission controller 130 controls the processing circuit 120 to provide a different A-MPDU to the first transmitting circuit 115 for transmission.

In an example of an error in the sub channel level, the first retransmission controller 130 does not invoke a backoff procedure. In an example, the first retransmission controller 130 identifies the targeted second electronic device in which the error in the sub channel level happens, and causes a retransmission of data units to the targeted second electronic device in a next scheduled transmission.

In another example, a trigger signal is sent by the first electronic device 110 to allocate a sub channel to a targeted second electronic device. The first transmission controller 130 detects an error in the sub channel level when there is no uplink response in the sub channel allocated to the targeted second electronic device. In the example, the first retransmission controller 130 identifies the targeted second electronic device, and causes a transmission of a trigger signal that is indicative of resources allocation to the targeted second electronic device in a next scheduled transmission. The resource allocation to the targeted second electronic device can be the same as the previous transmission or can be different from the previous transmission.

In an example of an error in the data unit level, the first retransmission controller 130 does not invoke a backoff procedure. In an example, the first retransmission controller 130 identifies the targeted second electronic device in which the error happens and identifies one or more data units that are unacknowledged. Then, the first retransmission controller 130 causes a retransmission of the identified data units to the targeted second electronic device in a next scheduled transmission.

According to an aspect of the disclosure, on the STA device side, using the second electronic device 160a as an example, the second retransmission controller 180a detects an error in the sub channel level when a specific timer expires. In an example, the specific timer tracks a time duration from a transmission to a proper reply, and when the time is longer than a threshold, the specific timer expires or has a timeout. In an example, the specific timer measures a time duration from a transmission of data units to a reception of a proper acknowledgement (ACK), and is referred to as an ACK timer.

In another embodiment, the second retransmission controller 180a detects an error in the sub channel level when the second electronic device 160a receives unscheduled transmission. In an example, the second electronic device 160a transmits data units, and expects reception of an ACK frame. When the second electronic device 160a receives frame other than the ACK frame, the second retransmission controller 180a detects an error in the sub channel level.

In another embodiment, the second retransmission controller 180a detects an error in a data unit (e.g., MPDU) level when the second retransmission controller 180a detects one or more unacknowledged frames in a block acknowledgement (BA). In an example, the second electronic device 160a transmits data units (e.g., an A-MPDU having aggregated MPDUs) to the first electronic device 110, and receives a BA. When the second retransmission controller 180a detects that the BA does not include acknowledgement for one or more data units (MPDUs) of the transmitted data units, the second retransmission controller 180a detects an error in the data unit level.

Additionally, the second retransmission controller 180a is configured to control retransmission based on the transmission error levels. In an example, when resources allocation of a next scheduled uplink transmission is available for the second electronic device 160a, the second retransmission controller 180a causes a retransmission of data units to the first electronic device 110 in the next scheduled uplink transmission.

In another example, the second retransmission controller 180a causes a resource request to be sent to the first electronic device 110. In an example, the second retransmission controller 180a uses an orthogonal frequency-division multiple access (OFDMA) opportunity to send a resource request frame to the first electronic device 110. In another example, the second retransmission controller 180a uses OFDMA opportunity to send a buffer status report frame. In an example, the second retransmission controller 180a counts unacknowledged data units in the buffer as pending uplink traffic. The buffer status report frame is indicative of a resource request for uplink transmission. In another example, the second retransmission controller 180a inserts a resource request for uplink transmission in an acknowledgement frame for downlink transmission, and provides the acknowledgement frame for downlink transmission to the second transmitting circuit 165a to transmit to the first electronic device 110.

In another example, the second retransmission controller 180a uses a contention based channel access technique, such as enhanced distributed channel access (EDCA) and the like. In an example, when the data units are time sensitive traffic, the second retransmission controller 180a uses the contention based channel access technique to gain an uplink transmission opportunity that is earlier than a scheduled uplink transmission.

Figure 2:
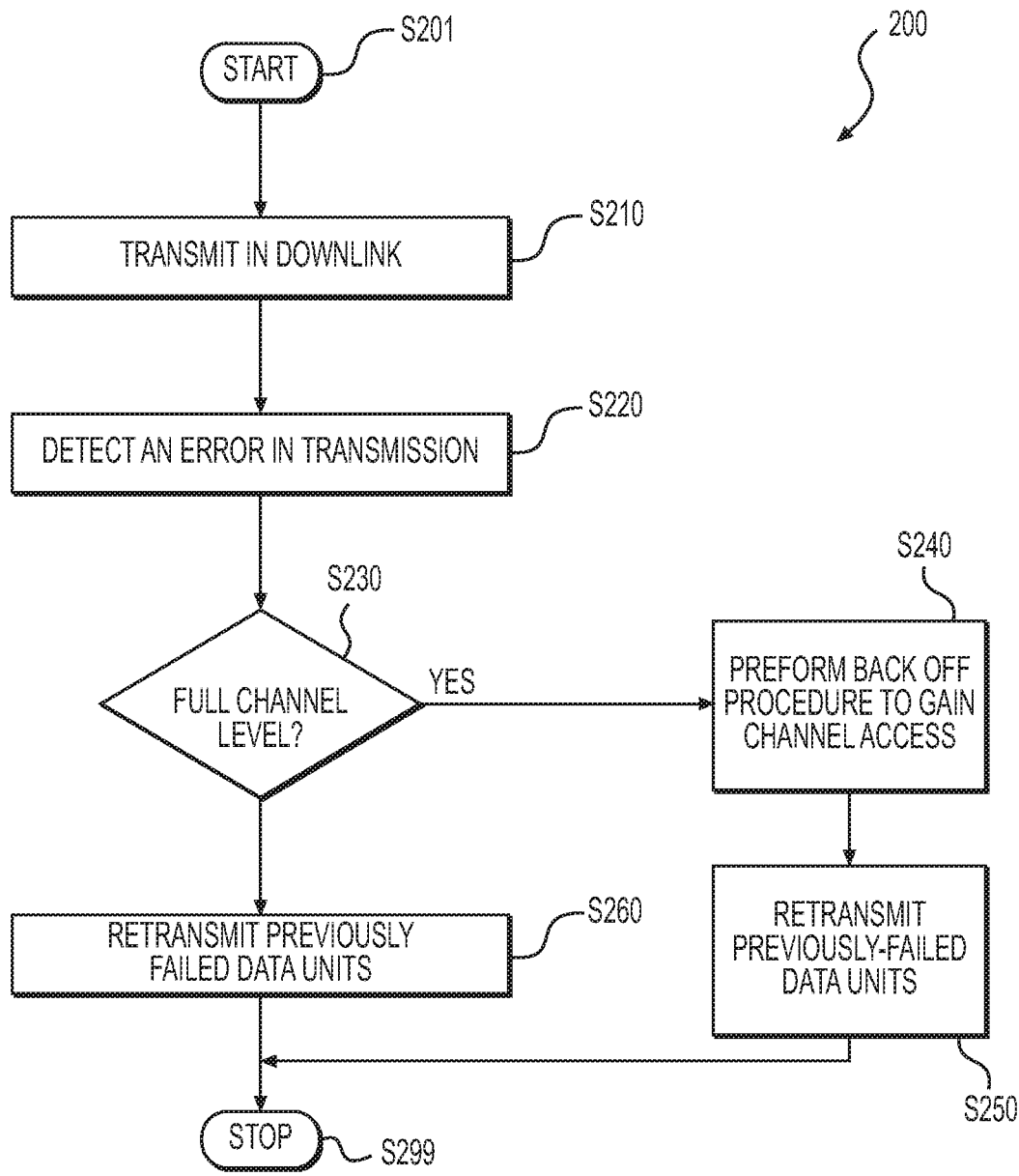
FIG. 2 shows a flow chart outlining a process 200 according to an embodiment of the disclosure.

FIG. 2 shows a flow chart outlining a process 200 according to an embodiment of the disclosure. In an example, the process 200 is executed by the first electronic device 110 in the FIG. 1 example. The process starts at S201 and proceeds to S210.

At S210, a downlink transmission is performed. In the FIG. 1 example, the first electronic device 110 transmits data units to the second electronic device 160a-160n. In an example, the first electronic device 110 gains channel access of a communication channel. Then the first electronic 110 uses the communication channel to transmit downlink (DL) signals carrying data units (frames) from the first electronic device 110 to the second electronic devices 160a-160n. In an example, the first electronic device 110 allocates resources of the communication channel to the targeted second electronic devices by sub channels, and uses the sub channels to respectively carry data units to the respective targeted second electronic devices.

At S220, an error is detected. In the FIG. 1 example, the first electronic device 110 detects a transmission error at various channel level, such as a full channel level, a sub channel level and a data unit level, and the like.

At S230, the process proceeds based on the channel level of the error. When the error is at the full channel level, the process proceeds to S240; otherwise the process proceeds to S260.

At S240, a backoff procedure is performed to gain a next channel access. In an example, the error in the full channel level is indicative of heavy communication traffic, thus the first electronic device 110 doubles the contention window. The first electronic device 110 randomly selects a value within the contention window, and sets a backoff counter for the backoff procedure. The backoff procedure is used to defer a next access to transmission medium (e.g., a communication channel) when the transmission medium is idle.

At S250, a retransmission of previously failed data units is performed. In an example, the first electronic device 110 retransmits the data units in the previous transmission. Then the process proceeds to S299 and terminates.

At S260, the previously failed data units are retransmitted in a next scheduled downlink transmission to the targeted second electronic devices. In an example of an error in the sub channel level, the first retransmission controller 130 does not invoke a backoff procedure. In an example, the first retransmission controller 130 identifies the targeted second electronic device in which the error in the sub channel level happens, and causes a retransmission of data units to the targeted second electronic device in a next scheduled downlink transmission.

In an example of an error in the data unit level, the first retransmission controller 130 does not invoke a backoff procedure. In an example, the first retransmission controller 130 identifies the targeted second electronic device in which the error happens and identifies one or more data units without acknowledgement. Then, the first retransmission controller 130 causes a retransmission of the identified data units to the targeted second electronic device in a next scheduled downlink transmission. Then the process proceeds to S299 and terminates.

Figure 3:
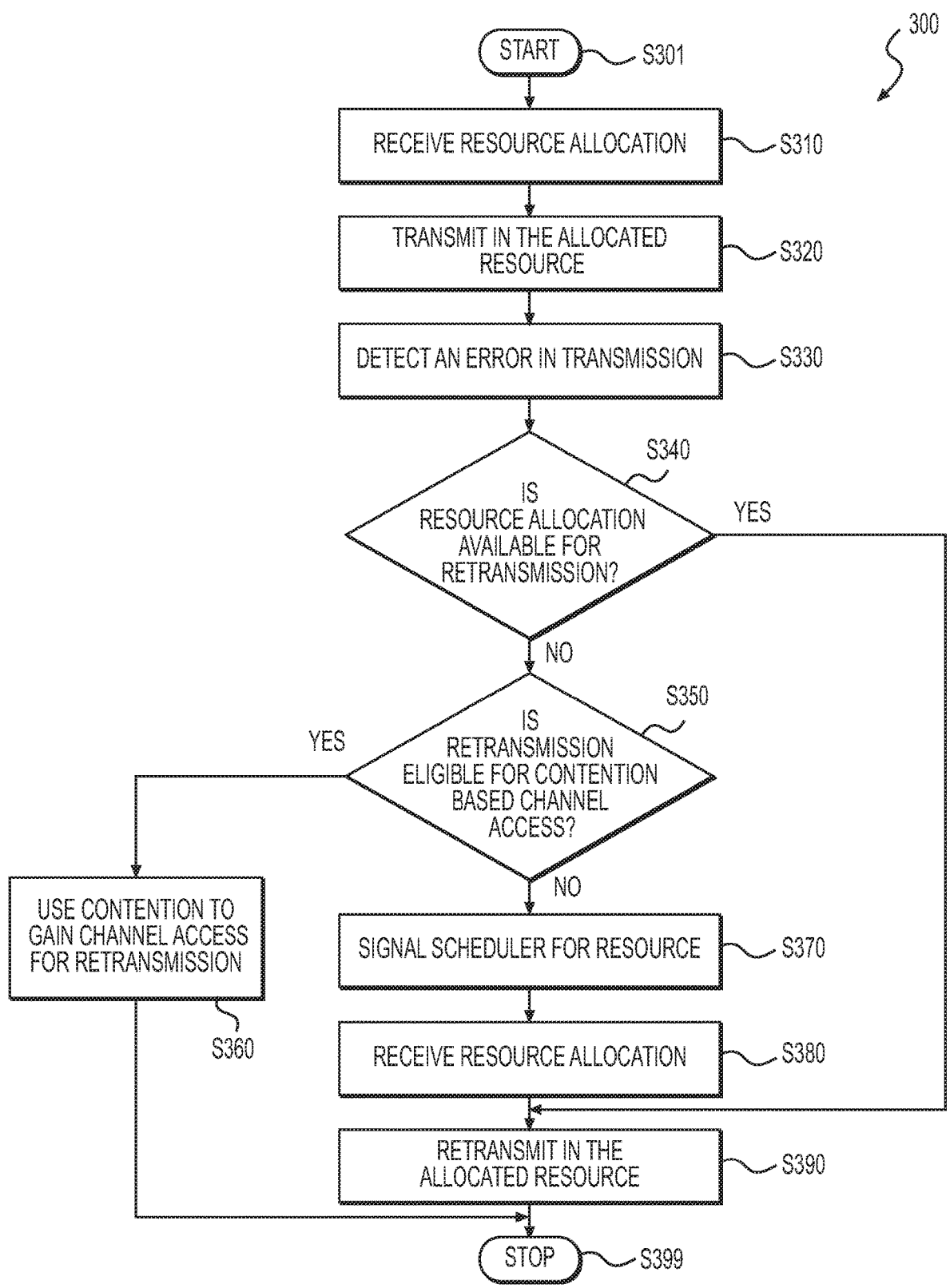
FIG. 3 shows a flow chart outlining a process 300 according to an embodiment of the disclosure.

FIG. 3 shows a flow chart outlining a process 300 according to an embodiment of the disclosure. In an example, the process 300 is executed by a second electronic device, such as the second electronic device 160a. The process starts at S301 and proceeds to S310.

At S310, uplink resource allocation is received. In an example, the second electronic device 160a receives a trigger signal that is indicative of uplink resource allocation. For example, a sub channel is allocated to the second electronic device 160a.

At S320, data units are transmitted according to resource allocation for the uplink transmission. In an example, the second electronic device 160a aggregates MPDUs into an A-MPDU, and transmits signals that carry the A-MPDU to the first electronic device 110 using the allocated resource in the uplink transmission.

At S330, an error is detected. The second electronic device 160a detects errors in the sub channel level and the data unit level.

At S340, the process proceeds based on whether uplink resource allocation is available for retransmission. When the uplink resource allocation is available for retransmission, the process proceeds to S390; otherwise, the process proceeds to S350.

At S350, the process proceeds based on whether the retransmission is eligible for contention based channel access (e.g., EDCA). When the retransmission is eligible for the contention based channel access, the process proceeds to S360; otherwise, the process proceeds to S370.

At S360, contention is used to gain channel access for retransmission, and the retransmission is performed. Then the process proceeds to S399 and terminates.

At S370, a request is send to the first electronic device 110 to request resource for retransmission.

At S380, resource allocation for retransmission is received.

At S390, retransmission is performed based on the resource allocation. Then, the process proceeds to S399 and terminates.

Figure 4:
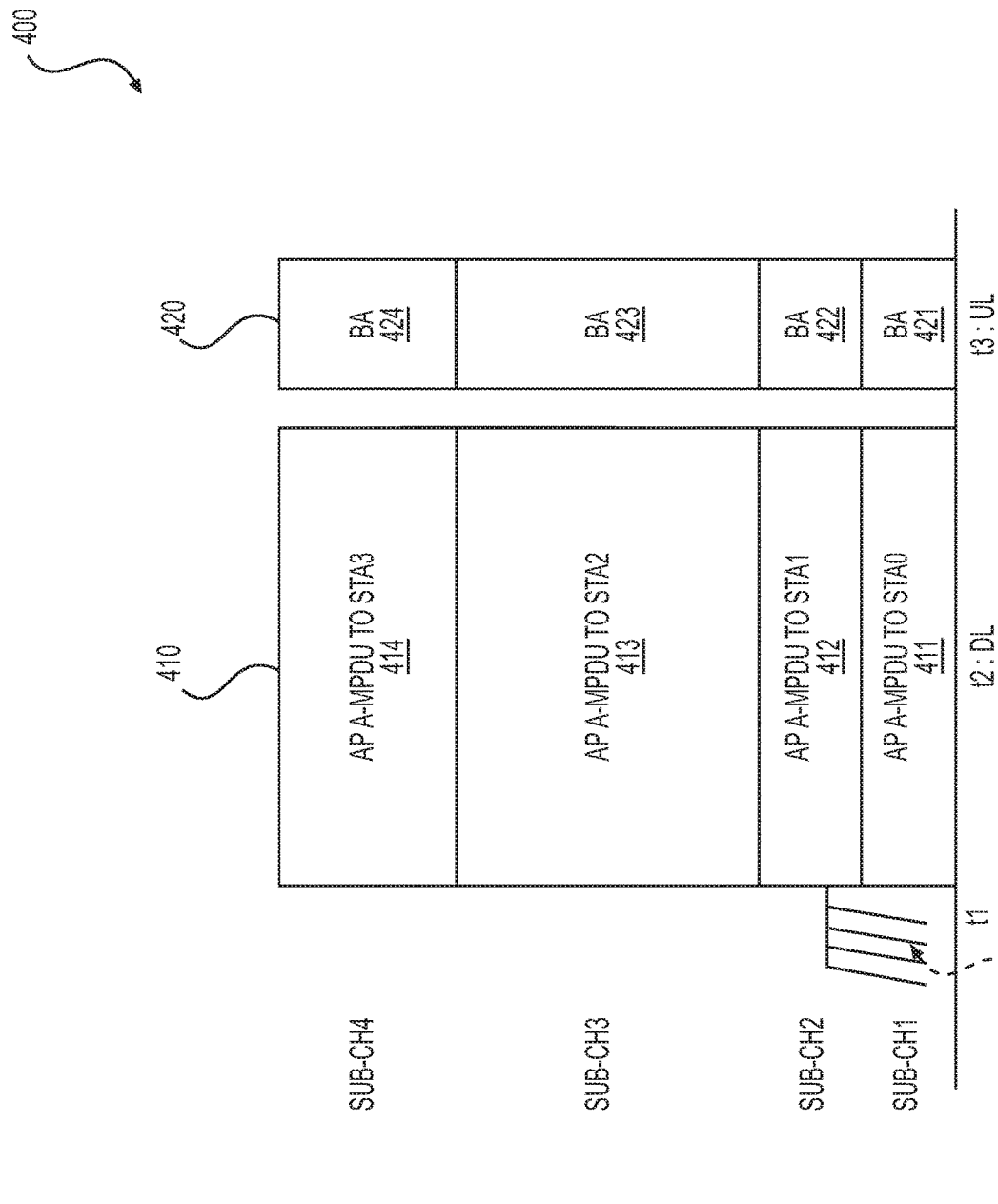
FIGS. 4-8 show plots illustrating scheduling based data exchange sequences according to embodiments of the disclosure.

FIG. 4 shows a plot 400 illustrating a scheduling based data exchange sequence example in the network 100 according to embodiments of the disclosure. In an example, the first electronic device 110 is the AP device, the second electronic devices 160a-160n are STA devices, the STA0-STA3 are the targeted STA devices. In the FIG. 4 example, the AP gains channel access and uses a communication channel to transmit information to the targeted STA devices STA0-STA3.

In the FIG. 4 example, the AP allocates a first sub channel SUB-CH1 to STA0, a second sub channel SUB-CH2 to STA1, a third sub channel SUB-CH3 to STA2, and a fourth sub channel SUB-CH4 to STA3.

At t1, the first electronic device 110 gains the channel access for the communication channel.

At t2, the first electronic device 110 uses the communication channel to perform downlink (DL) transmission to transmit data units from the first electronic device 110 to the targeted STA devices. Specifically, the first sub channel SUB-CH1 carries an A-MPDU 411 to the STA0; the second sub channel SUB-CH2 carries an A-MPDU 412 to the STA1; the third sub channel SUB-CH3 carries an A-MPDU 413 to the STA2; and the fourth sub channel SUB-CH4 carries an A-MPDU 414 to the STA3.

At t3, the first electronic device 110 expects uplink transmission carrying block acknowledgements (BAs) from the targeted STA devices STA0-STA3. The BAs are used to indicate whether MPDUs are received with success in an example. In the FIG. 4 example, the first sub channel SUB-CH1 carries a BA 421 that is used to indicate whether MPDUs in the A-MPDU 411 are successfully received by the STA0; the second sub channel SUB-CH2 carries a BA 422 that is used to indicate whether MPDUs in the A-MPDU 412 are successfully received by the STA1; the third sub channel SUB-CH3 carries a BA 423 that is used to indicate whether MPDUs in the A-MPDU 413 are successfully received by the STA2; and the fourth sub channel SUB-CH4 carries a BA 424 that is used to indicate whether MPDUs in the A-MPDU 414 are successfully received by the STA3.

However, errors can happen, and the first electronic device 110 is configured to detect errors at different levels, such as a full channel level, a sub channel level, a MPDU level, and the like.

In an example, the first electronic device 110 detects an error at the full channel level when a specific timer, such as the ACK timer, the CTS timer, and the like expires the first electronic device 110 receives the uplink signals. In another example, the first electronic device 110 detects an error at the full channel level when the first electronic device 110 receives something else other than the expected BAs.

In another example, the first electronic device 110 detects an error at the sub channel level when the first electronic device 110 receives a subset of BAs in the uplink signals, and fails to receive one or more BAs from STAs. For example, the first electronic device 110 fails to receive the BA 424 from the fourth sub channel SUB-CH4, thus the first electronic device 110 detects an error in the fourth sub channel SUB-CH4.

In another example, the first electronic device 110 detects an error at the data unit level when the first electronic device 110 detects unacknowledged MPDUs. For example, the first electronic device 110 aggregates three MPDUs in an A-MPDU 414, and transmits the A-MPDU 414 to the STA3 in the fourth sub channel SUB-CH4. However, the BA 424 that is received from the fourth sub channel SUB-CH4 includes acknowledgement of two out of three MPDUs. Thus, the first electronic device 110 detects an error at the data unit level.

The first electronic device 110 then re-transmits based on the channel level of the error. In an example of an error in the full channel level, the first electronic device 110 uses a backoff procedure with exponentially increased (e.g., double) contention window to gain channel access. When the first electronic device 110 gains the channel access, in an example, the first electronic device 110 retransmits the same data units. In another example, the first electronic device 110 transmits new A-MPDU that aggregates the previously unacknowledged MPDUs.

In an example of an error in the sub channel, the first electronic device 110 does not invoke backoff procedure. In an example, the first electronic device 110 identifies the targeted second electronic device in which the error in the sub channel level happens, and causes a retransmission of data units to the targeted second electronic device in a next scheduled downlink transmission.

Figure 5:
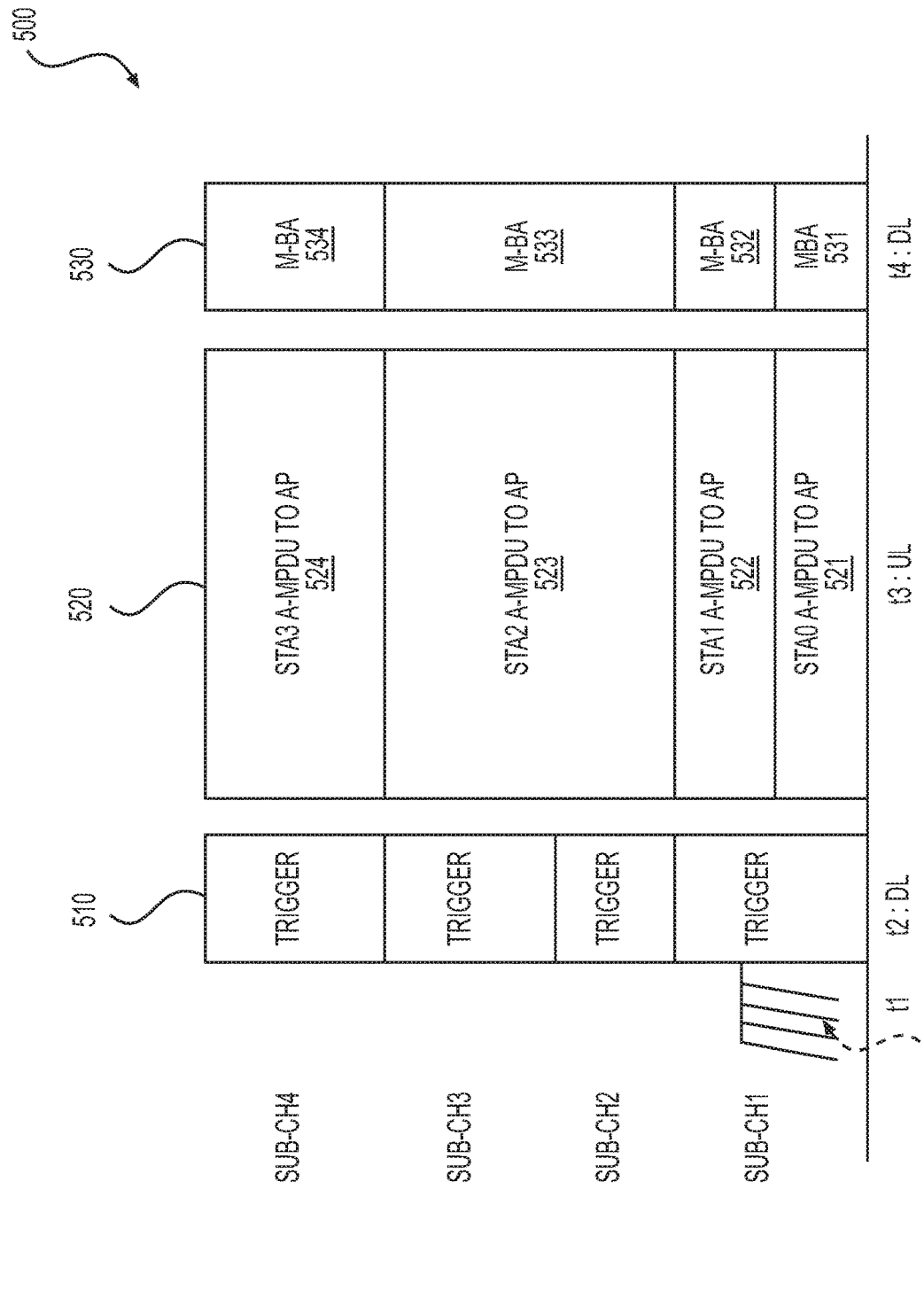

FIG. 5 shows a plot 500 illustrating a scheduling based data exchange sequence example in the network 100 according to embodiments of the disclosure. In an example, the first electronic device 110 is the AP device, the second electronic devices 160a-160n are STA devices, the STA0-STA3 are the targeted STA devices. In the FIG. 5 example, the AP gains channel access and schedules the targeted STA devices STA0-STA3 to perform uplink transmission.

In the FIG. 5 example, the AP allocates a first sub channel SUB-CH1 to STA0, a second sub channel SUB-CH2 to STA1, a third sub channel SUB-CH3 to STA2, and a fourth sub channel SUB-CH4 to STA3.

In the FIG. 5 example, the AP first gains channel access, and sends a trigger signal to the STA devices. The trigger signal carries various control information for the scheduled uplink transmission, such as timing, resource allocation, MCS, and the like. In an example, the trigger signal is a broadcast signal. In an example, the trigger signal includes allocation information, for example, the first sub channel SUB-CH1 allocated to STA0, the second sub channel SUB-CH2 allocated to STA1, the third sub channel SUB-CH3 allocated to STA2, and the fourth sub channel SUB-CH4 allocated to STA3.

At t1, the first electronic device 110 gains the channel access for the communication channel.

At t2, the first electronic device 110 uses the communication channel to transmit a trigger signal carrying various control information for the scheduled uplink transmission. In an example, the trigger signal is a broadcast signal.

At t3, the targeted STA devices perform the scheduled uplink transmission according to the resource allocation. Specifically, the first sub channel SUB-CH1 carries A-MPDU 521 from the STA0 to AP; the second sub channel SUB-CH2 carries A-MPDU 522 from the STA1 to AP; the third sub channel SUB-CH3 carries A-MPDU 523 from the STA2 to AP; and the fourth sub channel SUB-CH4 carries A-MPDU 524 from the STA3 to AP.

At t4, the first electronic device 110 transmits multi-user Bas (M-BAs) to the STA0-STA3 in the downlink transmission. The M-BAs are used to indicate whether MPDUs are received with success. In the FIG. 5 example, the first sub channel SUB-CH1 carries a M-BA 531 to indicate whether the MPDUs in the A-MPDU 521 are received with success to the STA0; the second sub channel SUB-CH2 carries a M-BA 532 to indicate whether the MPDUs in the A-MPDU 522 are received with success to the STA1; the third sub channel SUB-CH3 carries a M-BA 533 to indicate whether the MPDUs in the A-MPDU 523 are received with success to the STA2 and the fourth sub channel SUB-CH4 carries a M-BA 534 to indicate whether the MPDUs in the A-MPDU 524 are received with success to the STA3.

However, errors can happen, and both the first electronic device 110 and the second electronic devices 160a-160n are configured to detect errors at different levels and retransmit accordingly.

At the AP side, in an example, the first electronic device 110 detects an error at the full channel level when a specific timer, such as the ACK timer, expires before the first electronic device 110 receives the uplink transmission. In another example, the first electronic device 110 detects an error at the full channel level when the first electronic device 110 receives something else other than the expected A-MPDUs. In another example, the first electronic device 110 detects an error at the sub channel level when the first electronic device 110 receives A-MPDUs in a subset of sub channels in the uplink transmission, and fails to receive A-MPDU from a sub channel assigned to a targeted STA. For example, the first electronic device 110 fails to receive A-MPDU 524 from the fourth sub channel SUB-CH4, thus the first electronic device 110 detects an error in the fourth sub channel SUB-CH4.

At the STA side, in an example, the second electronic device 160a detects a reception error at a sub channel level when the ACK timer is time out before the second electronic device 160a receives the M-BA from the AP. In another example, the second electronic device 160a detects an error at the sub channel level when the second electronic device 160a receives something else other than the expected M-BA. In another example, the second electronic device 160a detects an error at the data unit level when the second electronic device 160a detects unacknowledged MPDUs. For example, the second electronic device 160a aggregates three MPDUs in the A-MPDU 524, and transmits the A-MPDU 524 to the AP in the fourth sub channel SUB-CH4. However, the M-BA 534 includes acknowledgement of two out of three MPDUs. Thus, the second electronic device 160a detects an error at the data unit level.

The first electronic device 110 then re-transmits based on the channel level of the error. In an example of an error in the full channel level, the first electronic device 110 uses a backoff procedure with exponentially increased (e.g., double) contention window to gain channel access. When the first electronic device 110 gains the channel access, in an example, the first electronic device 110 retransmits, for example, the same trigger signal and the M-BAs. In another example, the first electronic device 110 transmits a new trigger signal, and M-BAs.

In an example of an error in the sub channel level, the first electronic device 110 does not invoke the backoff procedure. In an example, the first electronic device 110 identifies the targeted STA device in which the error in the sub channel level happens. When the first electronic device 110 schedules a next uplink transmission, the first electronic device 110 allocates uplink resource to the identified targeted STA device, transmits a trigger signal to inform the uplink resource allocation to the identified targeted STA device.

At the STA side, using the second electronic device 160a as an example, when the second electronic device 160a detects an error, the second electronic device 160a does not invoke backoff procedure. Further, in an example, the second electronic device 160a retransmits the previously unacknowledged MPUs in a next scheduled uplink transmission.

In another example, when the unacknowledged MPUs are time sensitive, the second electronic device 160a contents for channel access in order to retransmit the previously unacknowledged MPUs earlier than the next scheduled uplink transmission.

Figure 6:
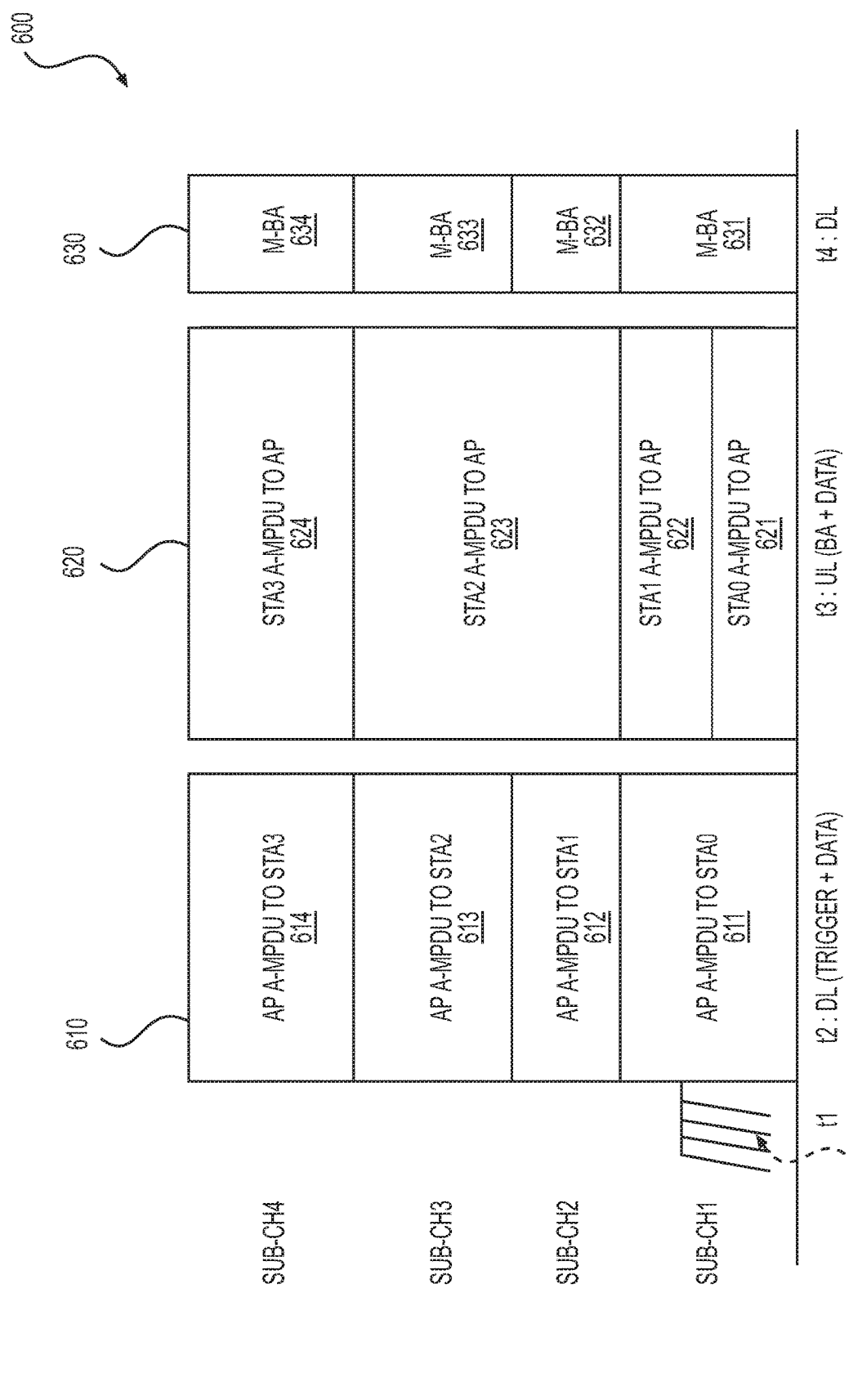

FIG. 6 shows a plot 600 illustrating a scheduling based data exchange sequence example in the network 100 according to an embodiment of the disclosure. In an example, the first electronic device 110 is the AP device, the second electronic devices 160a-160n are STA devices, the STA0-

STA3 are the targeted STA devices. In the FIG. 6 example, the AP device gains channel access and schedules the targeted STA devices STA0-STA3 to perform uplink transmission.

In the FIG. 6 example, the AP allocates a first sub channel SUB-CH1 to STA0, a second sub channel SUB-CH2 to STA1, a third sub channel SUB-CH3 to STA2, and a fourth sub channel SUB-CH4 to STA3.

At t1, the first electronic device 110 gains the channel access for the communication channel.

At t2, the first electronic device 110 uses the communication channel for a downlink transmission to transmit signals, such as trigger signal and data units, from the first electronic device 110 to the targeted STA devices. The trigger signal carries control information for scheduled uplink transmission. Specifically, the first downlink sub channel SUB-CH1 carries A-MPDU 611 and control information for scheduled uplink transmission to the STA0; the second downlink sub channel SUB-CH2 carries A-MPDU 612 and control information for scheduled uplink transmission to the STA1; the third sub channel SUB-CH3 carries A-MPDU 613 and control information for scheduled uplink transmission to the STA2; and the fourth sub channel SUB-CH4 carries A-MPDU 614 and control information for scheduled uplink transmission to the STA3.

At t3, targeted STA devices perform scheduled uplink transmission according to the resource allocation, and transmit BAs for the downlink data units. Specifically, the first uplink sub channel SUB-CH1 carries A-MPDU 621 from the STA0 to AP and BA for MPDUs in the A-MPDU 611; the second sub channel SUB-CH2 carries A-MPDU 622 from the STA1 to AP and BA for MPDUs in the A-MPDU 612; the third sub channel SUB-CH3 carries A-MPDU 623 from the STA2 to AP and BA for MPDUs in the A-MPDU 613; and the fourth sub channel SUB-CH4 carries A-MPDU 624 from the STA3 to AP and BA for MPDUs in the A-MPDU 614.

At t4, the first electronic device 110 transmits downlink signals carrying M-BAs to the STA0-STA3. The M-BAs are used to indicate whether MPDUs in the A-MPDUs 621-624 are received with success. In the FIG. 6 example, the first sub channel SUB-CH1 carries a M-BA 631 to indicate whether the MPDUs in the A-MPDU 621 are received with success to the STA0; the second sub channel SUB-CH2 carries a M-BA 632 to indicate whether the MPDUs in the A-MPDU 622 are received with success to the STA1; the third sub channel SUB-CH3 carries a M-BA 633 to indicate whether the MPDUs in the A-MPDU 623 are received with success to the STA2; and the fourth sub channel SUB-CH4 carries a M-BA 634 to indicate whether the MPDUs in the A-MPDU 624 are received with success to the STA3.

However, errors can happen, and both the first electronic device 110 and the second electronic devices 160a-160n are configured to detect errors at different levels and retransmit accordingly.

At the AP side, in an example, the first electronic device 110 detects an error at the full channel level when the ACK timer expires before the first electronic device 110 receives the uplink transmission. In another example, the first electronic device 110 detects an error at the full channel level when the first electronic device 110 receives something else other than the expected uplink transmission, such as BAs.

In another example, the first electronic device 110 detects an error at the sub channel level when the first electronic device 110 receives A-MPDUs in a subset of sub channels in the uplink transmission, and fails to receive A-MPDU from a sub channel assigned to a targeted STA device. For example, the first electronic device 110 fails to receive A-MPDU from the fourth sub channel SUB-CH4, thus the first electronic device 110 detects the error in the fourth sub channel SUB-CH4.

At the STA side, in an example, the second electronic device 160a detects an error at a sub channel level when the ACK timer expires before the second electronic device 160a receives the M-BA from the AP device. In another example, the second electronic device 160a detects an error at the sub channel level when the second electronic device 160a receives something else other than the expected M-BAs. In another example, the second electronic device 160a detects an error at the data unit level when the second electronic device 160a detects unacknowledged data units. For example, the second electronic device 160a aggregates three MPDUs in the A-MPDU 624, and transmits the A-MPDU 624 to the AP in the fourth sub channel SUB-CH4. However, the M-BA 634 that is received from the fourth sub channel SUB-CH4 includes acknowledgement of two out of three MPDUs. Thus, the second electronic device 160a detects the error at the data unit level.

The first electronic device 110 then re-transmits based on the level of reception errors. In an example of full channel reception error, the first electronic device 110 uses a backoff procedure with exponentially increased (e.g., double) contention window to gain channel access. When the first electronic device 110 gains the channel access, in an example, the first electronic device 110 retransmits the same trigger and data units. In another example, the first electronic device 110 transmits data units without trigger.

In an example of an error at the sub channel level, the first electronic device 110 does not invoke the backoff procedure. In an example, the first electronic device 110 identifies the targeted STA device in which the error in the sub channel level happens. When the first electronic device 110 schedules a next uplink transmission, the first electronic device 110 allocates uplink resource to the identified targeted STA device, transmits a trigger signal to inform the uplink resource allocation to the identified targeted STA device. In an example, the first electronic device 110 transmits unacknowledged MPDUs in a next scheduled downlink transmission.

In an example of an error at the data unit level, the first electronic device 110 does not invoke the backoff procedure. The first electronic device 110 identifies the targeted STA device in which the error happens, and transmits unacknowledged MPDUs in a next scheduled downlink transmission to the targeted STA device.

At the STA side, using the second electronic device 160a as an example, when the second electronic device 160a detects error in the sub channel level or the data unit level, the second electronic device 160a does not invoke backoff procedure. In an example, the second electronic device 160a retransmits the previously unacknowledged MPUs in next scheduled uplink transmission. In another example, when the unacknowledged MPUs are time sensitive, the second electronic device 160a contents for channel access in order to retransmit the previously unacknowledged MPUs earlier than the next scheduled uplink transmission.

Figure 7:
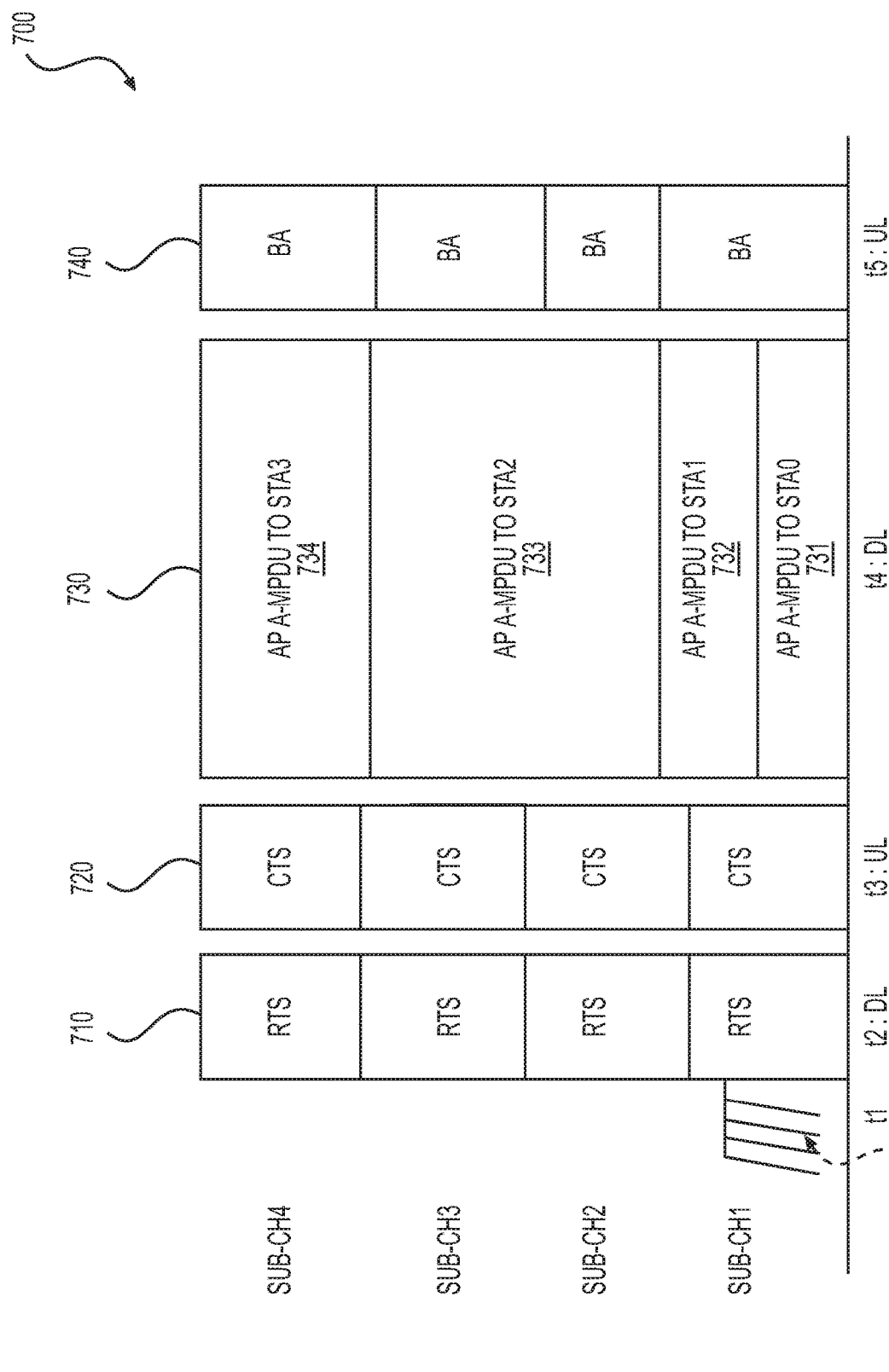

FIG. 7 shows a plot 700 illustrating a scheduling based data exchange sequence example in the network 100 according to an embodiment of the disclosure. In an example, the first electronic device 110 is the AP device, the second electronic devices 160a-160n are STA devices, the STA0-STA3 are the targeted STA devices. In the FIG. 7 example, the AP gains channel access and uses a communication channel to transmit information to the targeted STA devices STA0-STA3. The example in FIG. 7 is similar to the example in FIG. 4 except an exchange of RTS frame and CTS frame.

At t1, the first electronic device 110 gains the channel access for the communication channel.

At t2, the first electronic device 110 transmits a RTS frame to the targeted STA devices.

At t3, the targeted STA devices transmit signals carrying CTS frames.

At t4, the first electronic device 110 and the targeted STA devices operate similarly as FIG. 4 example at t2.

At t5, the first electronic device 110 and the targeted STA devices operate similarly as FIG. 4 example at t3.

The AP device and the targeted STA devices operate similarly as the example in FIG. 4, the description of operations has been provided above and will be omitted here for clarity purposes.

In the FIG. 7 example, in an embodiment, the first electronic device 110 detects an error at the full channel level when the CTS timer expires before the first electronic device 110 receives any CTS frame. In another example, the first electronic device 110 detects an error at the full channel level when the first electronic device 110 receives any other frames than an expected CTS frame. In the embodiment, the first electronic device 110 retransmits the RTS frame in an example, It is noted that, in an example, when the first electronic device 110 receives any CTS frame, the first electronic device 110 does not retransmit the RTS frame.

Figure 8:
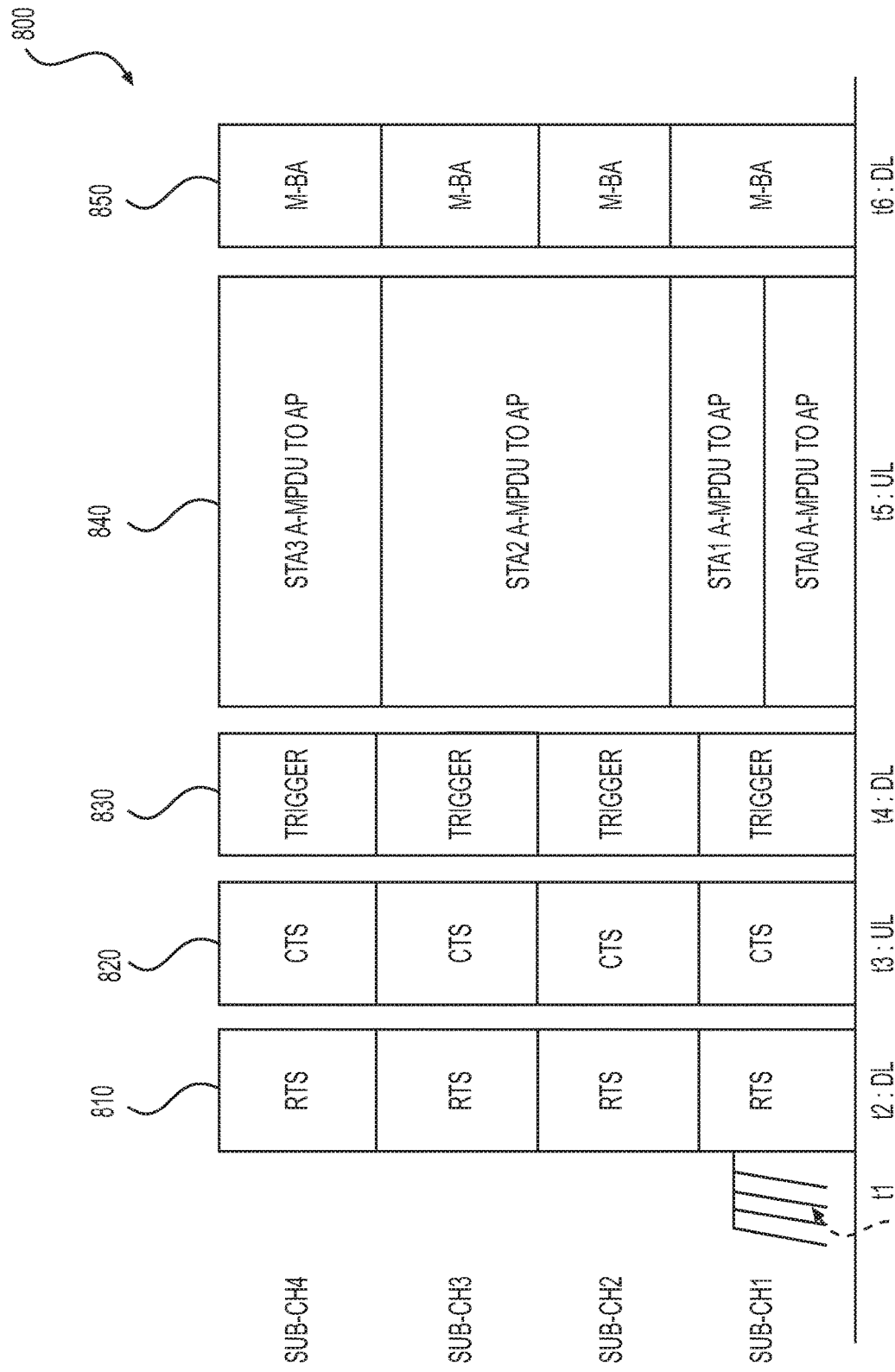

FIG. 8 shows a plot 800 illustrating a scheduling based data exchange sequence example in the network 100 according to an embodiment of the disclosure. In an example, the first electronic device 110 is the AP device, the second electronic devices 160a-160n are STA devices, the STA0-STA3 are the targeted STA devices. In the FIG. 8 example, the AP gains channel access and uses a communication channel to transmit information to the targeted STA devices STA0-STA3. The example in FIG. 8 is similar to the example in FIG. 5 except an exchange of RTS frame and CTS frame.

At t1, the first electronic device 110 gains the channel access for the communication channel.

At t2, the first electronic device 110 transmits a RTS frame to the targeted STA devices.

At t3, the targeted STA devices transmit signals carrying CTS frames.

At t4, the first electronic device 110 and the targeted STA devices operate similarly as FIG. 5 example at t2.

At t5, the first electronic device 110 and the targeted STA devices operate similarly as FIG. 5 example at t3.

At t6, the first electronic device 110 and the targeted STA device operates similarly as FIG. 5 example at t4.

The AP device and the targeted STA devices operate similarly to the example in FIG. 5, the description of operations has been provided above and will be omitted here for clarity purposes.

In the FIG. 8 example, in an embodiment, the first electronic device 110 detects an error at the full channel level when the CTS timer expires before the first electronic device 110 receives any CTS frame. In another example, the first electronic device 110 detects an error at the full channel level when the first electronic device 110 receives any other frames than an expected CTS frame. In the embodiment, the first electronic device 110 retransmits the RTS frame in an example, It is noted that, in an example, when the first electronic device 110 receives any CTS frame, the first electronic device 110 does not retransmit the RTS frame.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for wireless communication, the method comprising:

transmitting by an apparatus, a trigger signal carrying control information to allocate resources for scheduling a scheduled uplink transmission, the control information allocates resources to a set of at least one targeted apparatus for sending to the apparatus, data in the scheduled uplink transmission;

performing error detection by the apparatus to detect an error in the scheduled uplink transmission;

if an error is detected as the result of the performing and if the error is due to not receiving the scheduled uplink transmission, then:

performing a backoff procedure by the apparatus, and after performing the backoff procedure, transmitting by the apparatus, a second trigger signal carrying control information to allocate resources for scheduling a second scheduled uplink transmission;

if an error is detected as the result of the performing and if the error is due to receiving data from at least one of the targeted apparatuses of the set in the scheduled uplink transmission but not receiving data from all of the targeted apparatuses of the set in the scheduled uplink transmission, then transmitting by the apparatus, a second trigger signal carrying control information to allocate resources for scheduling a second scheduled uplink transmission, where a backoff procedure is not performed by the apparatus responsive to the error prior to the transmitting the second trigger signal.

2. The method of claim 1, wherein the control information allocates resources to the set of at least one targeted apparatus for sending to the apparatus, data units in the scheduled uplink transmission.

3. The method of claim 2, wherein the data units are characterized as media access control protocol data units (MPDU).

4. The method of claim 2, wherein the data units are characterized as a plurality of aggregated protocol data units (A-MPDU).

5. The method of claim 1 where the backoff procedure uses an exponentially increased contention window to gain a next channel access.

6. The method of claim 1, wherein if the error is due to receiving data from at least one of the targeted apparatuses of the set in the scheduled uplink transmission but not receiving data from all of the targeted apparatuses of the set in the scheduled uplink transmission, then the second trigger signal includes control information to allocate resources to targeted apparatuses of the set in which data was not received by the apparatus in the scheduled uplink transmission.

7. The method of claim 1, wherein the control information of the trigger signal allocates a subchannel of a plurality of subchannels of the scheduled uplink transmission to each targeted apparatus of the set for sending data in the scheduled uplink transmission.

8. The method of claim 1, wherein the error is due to not receiving the scheduled uplink transmission if an ACK timer expires before the apparatus receives the scheduled uplink transmission.

9. The method of claim 1, wherein the apparatus is characterized as an access point.

10. The method of claim 1, wherein if the error is due to not receiving the scheduled uplink transmission, then the second trigger signal includes control information to allocate resources to each of the targeted apparatuses of the set.

11. An apparatus for wireless communication, the apparatus comprising:
a transceiver configured to transmit and receive wireless signals and a processing circuit configured to:
initiate transmission of a trigger signal carrying control information to allocate resources for scheduling a scheduled uplink transmission, the control information allocates resources to a set of at least one targeted apparatus for sending to the apparatus, data in the scheduled uplink transmission;
perform error detection to detect an error in the scheduled uplink transmission;
if an error is detected and if the error is due to not receiving the scheduled uplink transmission, then:
invoke a backoff procedure, and
after invoking the backoff procedure, initiate transmission of a second trigger signal carrying control information to allocate resources for scheduling a second scheduled uplink transmission;
if an error is detected and if the error is due to receiving data from at least one of the targeted apparatuses of the set in the scheduled uplink transmission but not receiving data from all of the targeted apparatuses of the set in the scheduled uplink transmission, then initiate transmission of a second trigger signal carrying control information to allocate resources for scheduling a second scheduled uplink transmission, where a backoff procedure is not invoked responsive to the error prior to the second trigger signal being transmitted.

12. The apparatus of claim 11, wherein the control information allocates resources to the set of at least one targeted apparatus for sending to the apparatus, data units in the scheduled uplink transmission.

13. The apparatus of claim 12, wherein the data units are characterized as media access control protocol data units (MPDU).

14. The apparatus of claim 12, wherein the data units are characterized as a plurality of aggregated protocol data units (A-MPDU).

15. The apparatus of claim 11, wherein the backoff procedure uses an exponentially increased contention window to gain a next channel access.

16. The apparatus of claim 11, wherein if the error is due to receiving data from at least one of the targeted apparatuses of the set in the scheduled uplink transmission but not receiving data from all of the targeted apparatuses of the set in the scheduled uplink transmission, then the second trigger signal includes control information to allocate resources to targeted apparatuses of the set in which data was not received by the apparatus in the scheduled uplink transmission.

17. The apparatus of claim 11, wherein the control information of the trigger signal allocates a subchannel of a plurality of subchannels of the scheduled uplink transmission to each targeted apparatus of the set for sending data in the scheduled uplink transmission.

18. The apparatus of claim 11 further comprising:
an ACK timer;
wherein the error is due to not receiving the scheduled uplink transmission if the ACK timer expires before the apparatus receives the scheduled uplink transmission.

19. The apparatus of claim 11, wherein the apparatus is characterized as an access point.

20. The apparatus of claim 11, wherein if the error is due to not receiving the scheduled uplink transmission, then the second trigger signal includes control information to allocate resources to each of the targeted apparatuses of the set.

* * * * *